United States Patent [19]

Hanawa et al.

[11] Patent Number: 4,845,614
[45] Date of Patent: Jul. 4, 1989

[54] MICROPROCESSOR FOR RETRYING DATA TRANSFER

[75] Inventors: Makoto Hanawa, Kokubunji; Ikuya Kawasaki, Kodaira; Tadahiko Nishimukai, Sagamihara, all of Japan

[73] Assignee: Hitachi, Ltd., Tokyo, Japan

[21] Appl. No.: 83,169

[22] Filed: Aug. 10, 1987

[30] Foreign Application Priority Data

Aug. 12, 1986 [JP] Japan .................... 61-189201

[51] Int. Cl.⁴ .................... G06F 11/00; G06F 12/14
[52] U.S. Cl. .................................... 364/200
[58] Field of Search ... 364/200 MS File, 900 MS File; 371/32, 33, 12

[56] References Cited

U.S. PATENT DOCUMENTS

| | | | |
|---|---|---|---|
| 3,533,065 | 1/1968 | McGilvray et al. | 364/200 |
| 4,017,840 | 4/1977 | Schild et al. | 364/200 |
| 4,348,722 | 9/1982 | Gunter et al. | 364/200 |
| 4,417,334 | 11/1983 | Gunderson et al. | 364/200 |
| 4,524,415 | 6/1985 | Mills, Jr. et al. | 364/200 |
| 4,616,335 | 10/1986 | Howe, Jr. et al. | 364/900 |
| 4,621,323 | 11/1986 | Mayhew | 371/32 |

Primary Examiner—Gareth D. Shaw
Assistant Examiner—Adolfo Ruiz
Attorney, Agent, or Firm—Antonelli, Terry & Wands

[57] ABSTRACT

A microprocessor and a peripheral equipment communicate data through a bus. If an error occurs during communication, the microprocessor starts the next bus cycle and commands retry of the data communication. If a predetermined number of times of retry fail, and if an address signal corresponds to an unmounted area of an address space, wherein the unmounted area is an area of the address space not occupied by peripheral equipment including an I/O device, the microprocessor inhibits the retry.

8 Claims, 10 Drawing Sheets

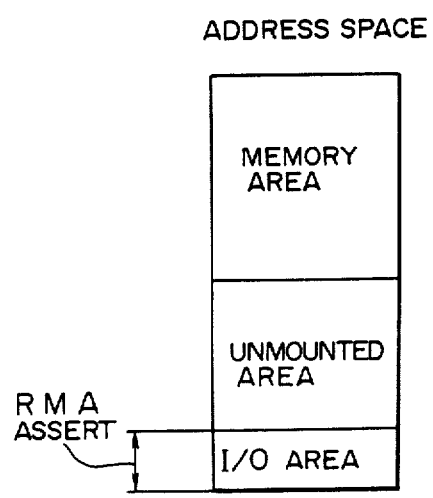
F I G. 5

12 4,845,614

MICROPROCESSOR FOR RETRYING DATA TRANSFER

BACKGROUND OF THE INVENTION

The present invention relates to a microprocessor having an improved method for retrying a data transfer cycle.

A microprocessor of this type is disclosed in U.S. Pat. 4,348,722. In this microprocessor, a normal end signal (DTACK) as well as an abnormal end signal (BERR) and a retry request signal (HALT) are used as data transfer response signals in order to retry a data transfer cycle.

FIGS. 1 and 5B of the U.S. Pat. 4,348,722 are quoted in FIGS. 7 and 8. As shown in FIG. 8, when the data transfer ends abnormally and the retry is requested, the signals BERR and HALT are asserted.

In requesting the retry, the following items must be checked:

(1) Whether the number of times of retry exceeds a limit?

(2) Whether the data transfer is retryable? That is, whether access to a control register is included?

(3) Whether the retry is significant? That is, whether access to an unmounted area is included?

The retry cannot be requested unless the above items have been checked.

In the prior art, timing of the BERR and HALT signal generation circuit is critical and it is difficult to design an external circuit of the microprocessor.

SUMMARY OF THE INVENTION

It is an object of the present invention to provide a microprocessor which solves the problems encountered in the prior art microprocessor, makes it easy to design an external circuit and improves a retry method of a data transfer cycle.

In accordance with one aspect of the present invention, if data transfer between the microprocessor and an external equipment ends abnormally, the number of times of retry of the same data transfer is counted, and if the number of times exceeds a predetermined limit, further retry is inhibited.

Other objects and features of the present invention will be apparent from the description of the preferred embodiments.

BRIEF DESCRIPTION OF THE DRAWINGS

FIG. 5 shows a relationship of assertion between an address space and a special access response signal RMA.

DESCRIPTION OF THE PREFERRED EMBODIMENTS

Figure 1:
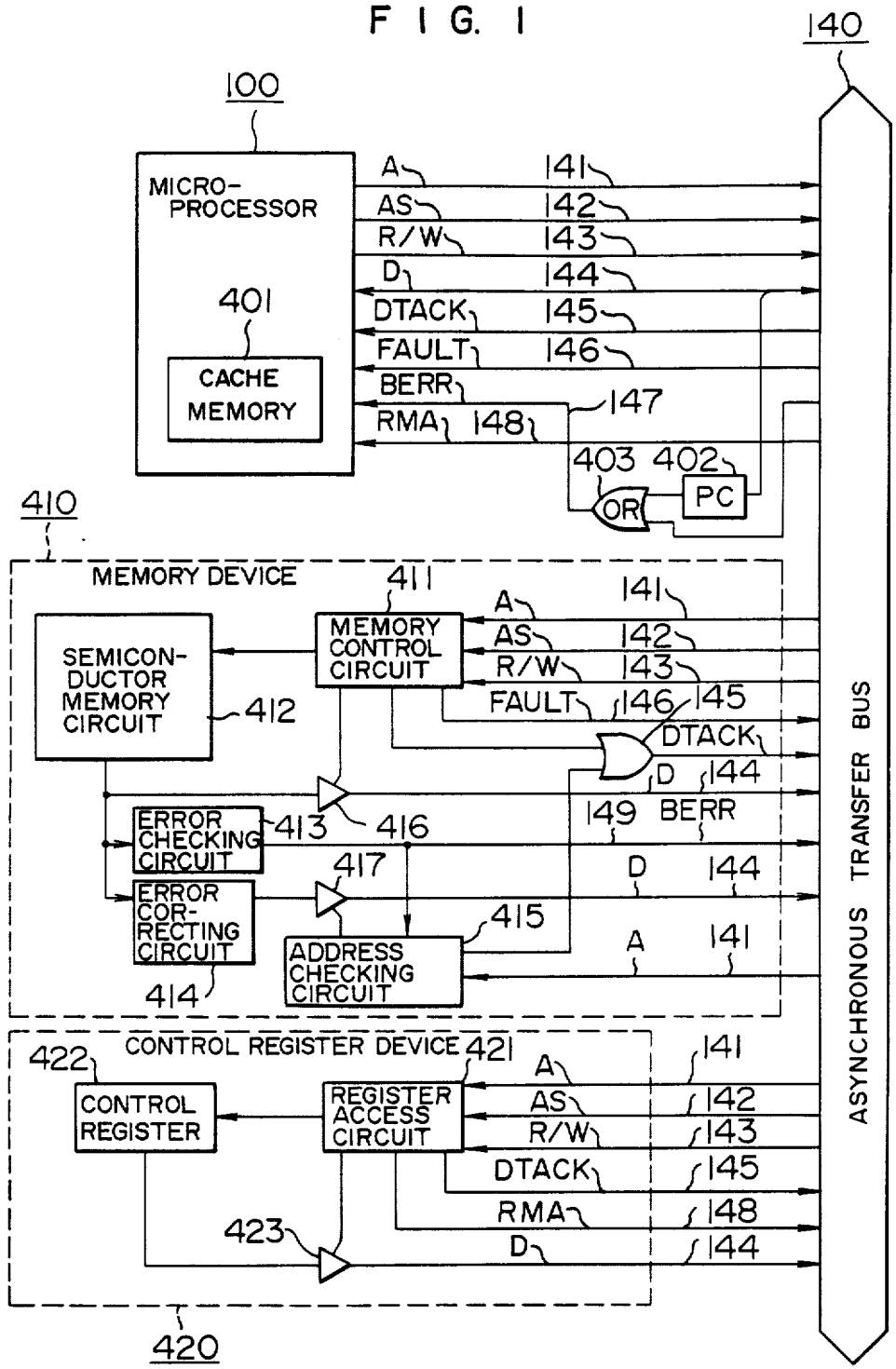
FIG. 1 shows a block diagram of a data processing system in which a microprocessor of the present invention is connected with peripheral equipments through a bus.

FIG. 1 shows a data processing system in accordance with one embodiment of the present invention. Microprocessor 100, memory device 410 and control register device 422 are interconnected through an asynchronous transfer bus 140.

The asynchronous transfer bus 140 comprises an address line (A) 141, an address strobe line (AS) 142, a read/write command line (R/W) 143, a data line (D) 144, a transfer acknowledge line (DTACK) 145, a fault line (FAULT) 146, a bus error line (BERR) 147 and a special access response line (RMA) 148.

The microprocessor 100 contains a small capacity and high speed cache memory to store input/output data of an arithmetic and logical unit (ALU) contained in the microprocessor 100. High speed data transfer is attainable between the cache memory 401 and the ALU.

A memory device 410 is provided to assist the data storing function. The memory device 410 contains a large capacity and low speed semiconductor memory 412. The memory device 410 further contains a magnetic storage device such as a hard disk or floppy disk.

A control register device 422 is provided between input/output devices (I/0 devices) not shown and the asynchronous transfer bus 140. Data entered by input means of the I/0 devices is transferred to the microprocessor 100. In other cases, data from the microprocessor 100 is transferred to output means of the I/0 devices.

A parity check circuit 402 connected to the data line of the asynchronous transfer bus 140 checks a parity of the data line 144, and if a parity error is detected, it asserts a bus error signal (BERR) 147.

The memory device 410 comprises a memory control circuit 411, a memory circuit 412, an error check circuit 413, an error correction circuit 414 and an address check circuit 415.

When a bus cycle is started, the memory control circuit 411 checks the address line (A) 141 to determine whether it is an access to a memory space or not. If it is an access to the memory space, it checks whether it is an access to a mounted memory space or not, and if it is an access to an unmounted area, it asserts a fault signal (FAULT) 146. If it is an access to the mounted area, it accesses the memory circuit 412 and asserts a transfer acknowledge signal (DTACK) 145.

In reading data, the read data is supplied to the data line D 144 through an output buffer 416 and error is checked by the error check circuit 413. If an error is detected, a bus error signal (BERR) 147 is asserted to request retry of the bus cycle.

The address check circuit 415 detects the request of retry of the bus cycle by the ECC (error check and correction) error and the error correction circuit 414 produces an error-corrected data through an output buffer 417. The address check circuit 415 asserts the DTACK 145.

The control register device 420 for the I/0 devices comprises a register access circuit 421 and a control register 422. When the bus cycle is started, the register access circuit checks the address 141 to determine whether it is an access to the control register or not. If it is an access to the control register 422 for the I/0 devices, (that is, if the address space is an I/0 area), the special access response signal RMA 148 is asserted and the control register is accessed and the DTACK 145 is asserted.

FIG. 5 shows a relation between the address space and the RMA signal 148. When data is transferred to the I/0 area, the special access response signal RMA 148 is asserted to inhibit retry by a bus error.

Figure 2:
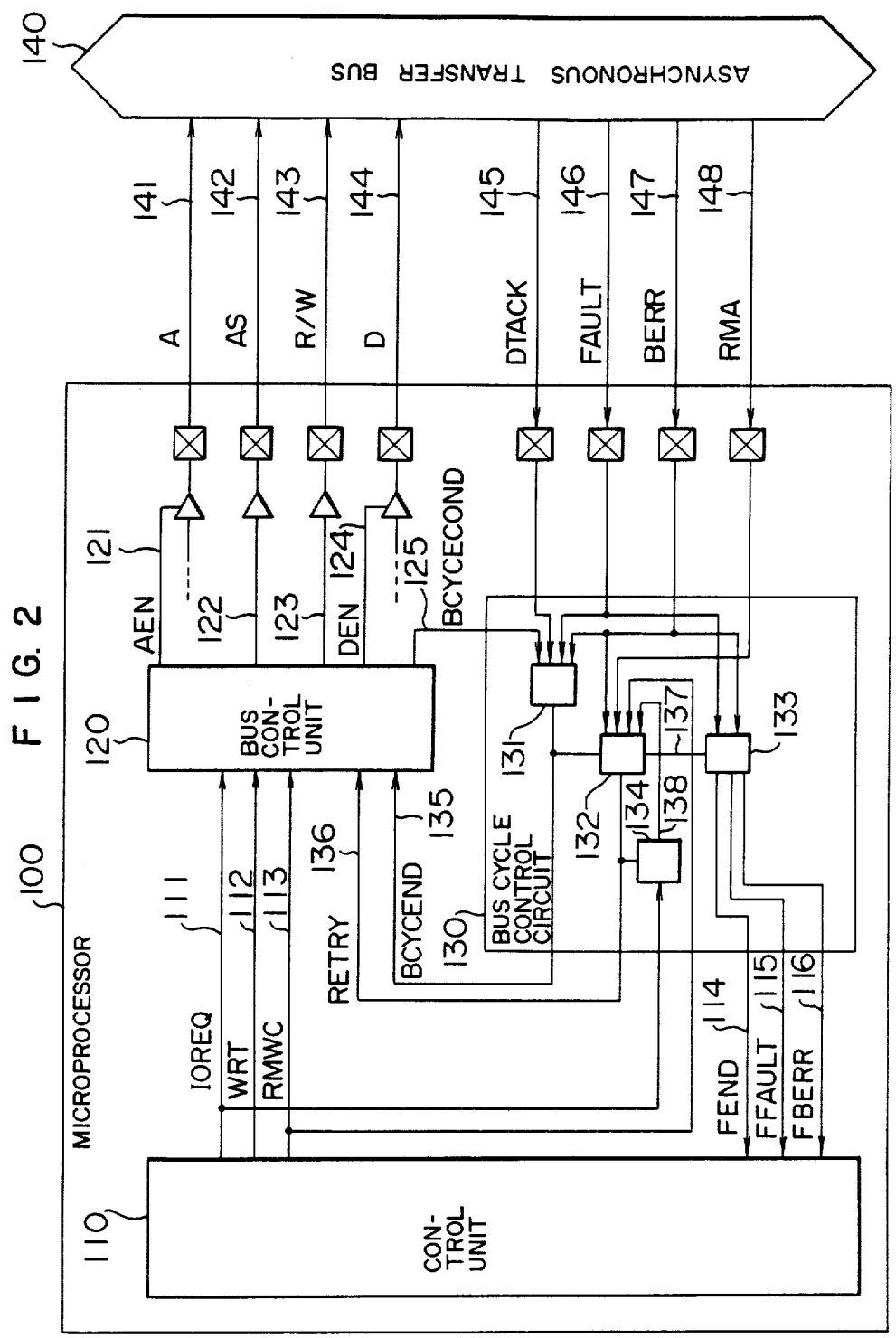
FIG. 2 shows a block diagram which shows a detail of the microprocessor of FIG. 1.

FIG. 2 shows a block diagram which shows a detail of the microprocessor 100.

The microprocessor 100 comprises a control unit 110, a bus control unit 120 and a bus cycle control circuit 130.

When data is transferred, the control unit 110 produces an I/0 request signal IOREQ 111. A read/ write command is issued through a line WRT 112, and in a read-modify-write operation, it is issued through a line RMWC 113. The read-modify-write operation means an operation in which a data read operation and a modify/ rewrite operation of the read data are continuously performed.

After the data has been transferred, the control unit 110 receives a fetch end signal FEND 114 from the bus cycle control circuit 130. When the fetch end signal is asserted, the bus cycle is terminated and the data transfer to the cache memory 401 of the microprocessor 100 is terminated. If the data transfer ends abnormally, the bus cycle control circuit 130 produces a fetch fault signal FFAULT 115 or fetch bus error signal FBERR 116 instead of the fetch end signal FEND 114. In response thereto, the control unit 110 starts a fault exceptional processing routine or bus error exceptional processing routine which will be explained later in detail.

When the bus control unit 120 receives the I/0 request signal 111, it produces an address output enable signal (AEN) 121, an internal signal 122 of the address strobe line 142, an internal signal 123 of the read/write command line 143 and a data output enable signal (DEN) 124 to start the bus cycle. It also produces a signal BCYCECOND 125 to start the bus cycle control circuit 130.

The bus cycle control circuit 130 comprises an end detection circuit 131, a retry circuit 132, an end report circuit 133 and a retry counter 134. When the start signal 12 is asserted, the end detection circuit 131 samples the transfer acknowledge line 145, fault line 146 and bus error line 147, and if one of the signals is asserted, it produces an end of bus cycle signal to report the end of bus cycle to the bus control unit 120.

The retry circuit 132 responds to the end of bus cycle signal 135 to produce a retry signal RETRY 136 when retry is to be done, or an end signal END 137 when retry is not to be done. The retry signal RETRY 136 is supplied to the bus control unit 120 to retry the bus cycle. The end signal END 137 is supplied to an end report circuit 133 which generates, together with the fault line 146 and the bus error line 147, the FEND 114, FFAULT 115 and FBERR 116.

The retry counter 134 is cleared by the IOREQ 111 and counted up by the RETRY 136. When the number of times of retry reaches a predetermined limit, it produces a signal MAXR 138 to inhibit further retry.

Figure 3:
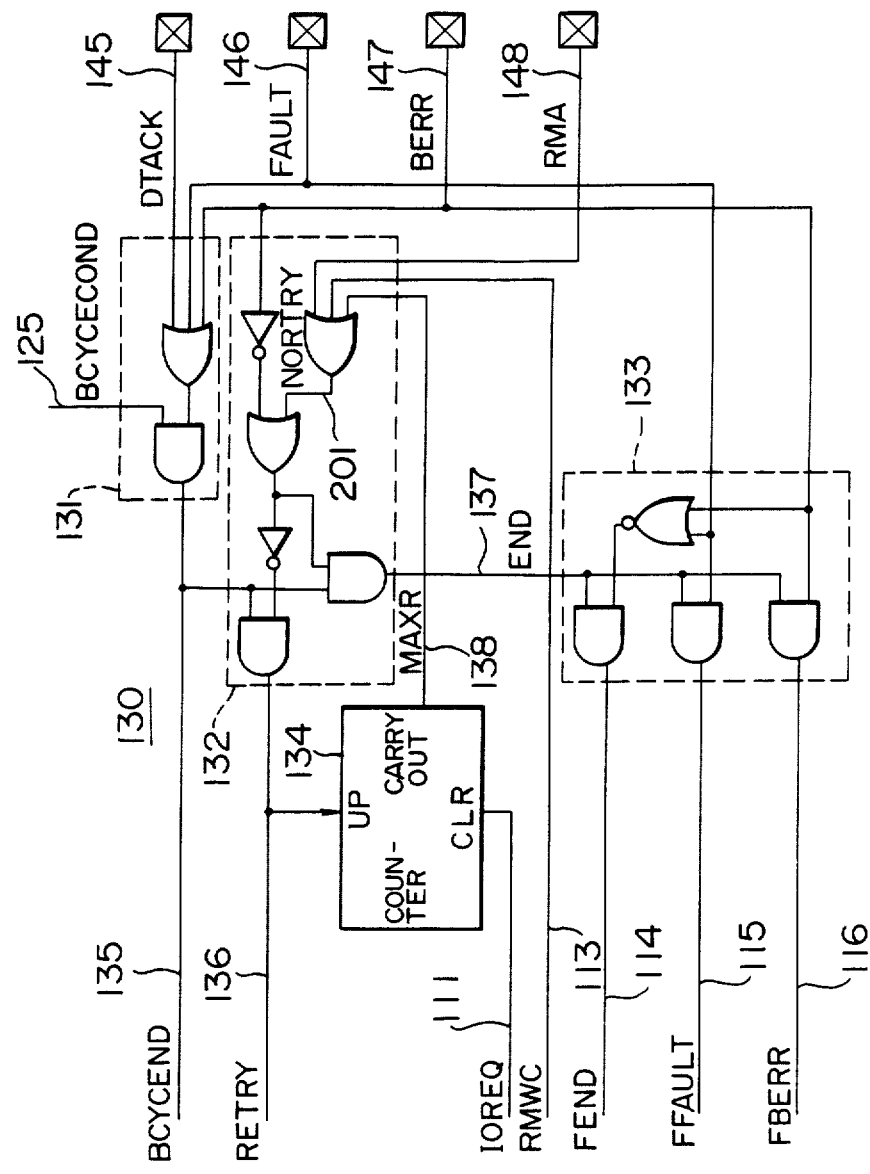
FIG. 3 shows a block diagram which shows a detail of a bus cycle control circuit of FIG. 2, FIGS. 4a, 4b, 4c and 4d show time charts of signal waveforms in transferring data in the data processing system.

FIG. 3 shows a circuit diagram of the bus cycle control circuit 130. When the BCYCEND 135 is asserted, the retry circuit 132 asserts the END 137 if the BERR 147 is negated or a signal (NORETRY) 201 to inhibit retry is asserted. On the other hand, if the BERR 147 is asserted and the retry inhibit signal NORETRY 201 is negated, the retry circuit 132 asserts the RETRY 136.

The retry inhibit signal (NORETRY) 201 is produced by a logical OR of the special access response signal RMA 148 from the external, the read-modify-write command signal 113 from the control unit 110 and the signal MAXR 138 from the retry counter 134.

Data transfer errors between the microprocessor 100 and the peripheral equipments (memory device 410, and control register device 420) through the asynchronous transfer bus 140 are classified into several modes.

For example, in the data processing system of FIG. 1, if a slight parity error is detected on the data line D 144, the output of the parity check circuit 402 is asserted. On the other hand, if a slight soft error is detected in the memory circuit 412 of the memory device 410, the output of the error check circuit 413 is asserted. In any case, the bus error signal BERR applied to the microprocessor 100 is asserted. In such a case, the retry of bidirectional data transfer between the microprocessor 100 and the peripheral equipments 410 and 420 is significant and the retry is performed. In FIG. 4, a bus error is detected in one bus cycle, and in the next bus cycle, the retry is performed and the transfer is terminated.

Figure 4A:
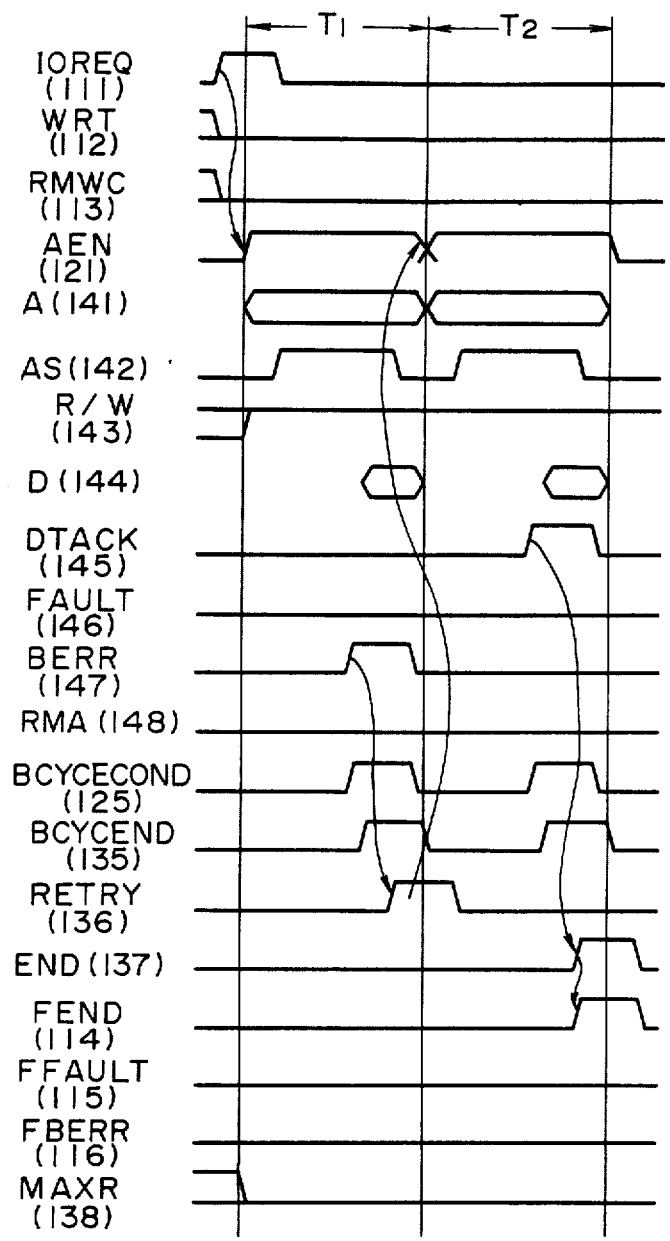

As shown in FIG. 4a, when the I/0 request signal IOREQ 111 is asserted, the bus control unit 120 of the microprocessor 100 starts a first bus cycle $T_1$. The address output enable signal AEN 121 is asserted and the address signal A 141, address strobe signal AS 142 and data signal D 144 are supplied from the microprocessor 100 to the asynchronous transfer bus 140. If a slight parity error or soft error is detected in the bus cycle $T_1$, the bus error signal BERR 147 is asserted. Thus, the end of bus cycle signal BCYCEND 135 and the retry signal RETRY 136 are asserted, and the first bus cycle $T_1$ ends and a second bus cycle $T_2$ starts. In the bus cycle $T_2$, the signal AEN 121 is asserted and the signals A 141, AS 142 and D 144 are supplied from the microprocessor 100 to the bus 140. If the data transfer in the second bus cycle $T_2$ succeeds (that is, no parity error nor soft error), the transfer acknowledge signal DTACK 145 is asserted, and the end signal END 137 and the fetch end signal FEND 114 is asserted, and the second bus cycle $T_2$ is terminated.

Figure 4B:
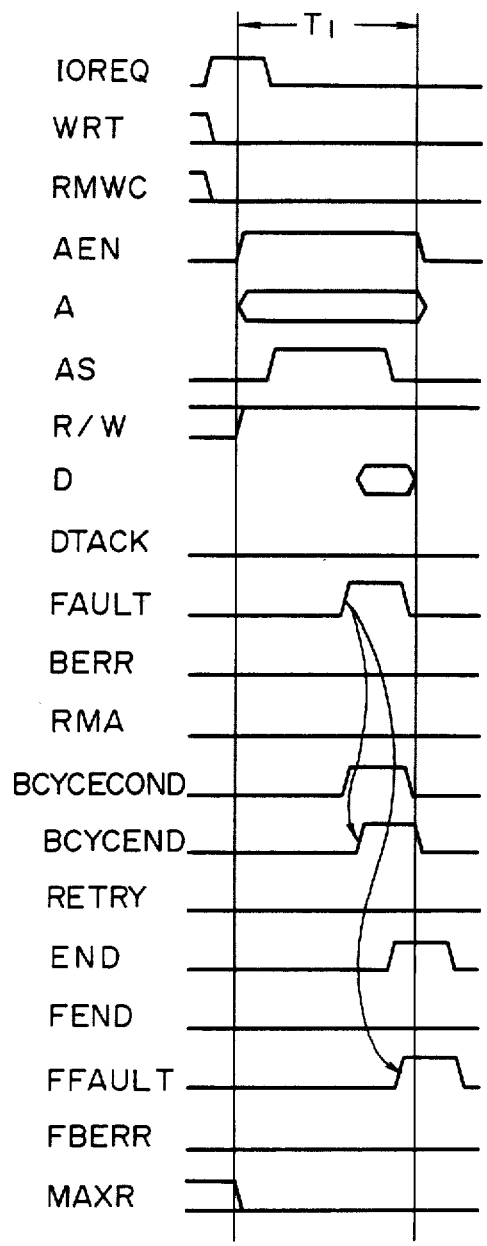

On the other hand, the retry of data transfer is insignificant for certain access error. For example, when the microprocessor 100 accesses an unmounted area of the address space of FIG. 5 (that is, an area other than address areas of the memory device 410 and the I/0 control register 420), it is insignificant. This may occur when a software programmer uses memory functions in excess of the capacity of the memory device 410. In case of such fault, the retry of bidirectional data transfer between the microprocessor 100 and the peripheral equipments 410 and 420 is insignificant and the retry is not performed. In FIG. 4b, a fault is detected in one bus cycle and retry is not performed in the next bus cycle.

When the address signal A 141 accesses an unmounted area of the address space of FIG. 5, the memory control circuit 411 of the memory device 410 asserts the fault signal FAULT 146, which is supplied to the bus cycle control circuit 130 of the microprocessor 100 through the asynchronous transfer bus 140. In this case, since the retry signal RETRY 136 is not asserted by the memory control circuit 130 in the bus cycle $T_1$, the bus control unit 120 does not perform the retry. On the other hand, the bus cycle control circuit 130 asserts the end of bus cycle signal BCYCEND 135, end signal END 137 and fetch fault signal FFAULT 114. In response to the fetch fault signal FFAULT 114, the control unit 110 of the microprocessor 100 commands the fault exceptional processing routine, which informs the fact that the address signal has accessed the unmounted area, to programmer, operator and user through the output means of the I/0 devices.

Figure 4C:
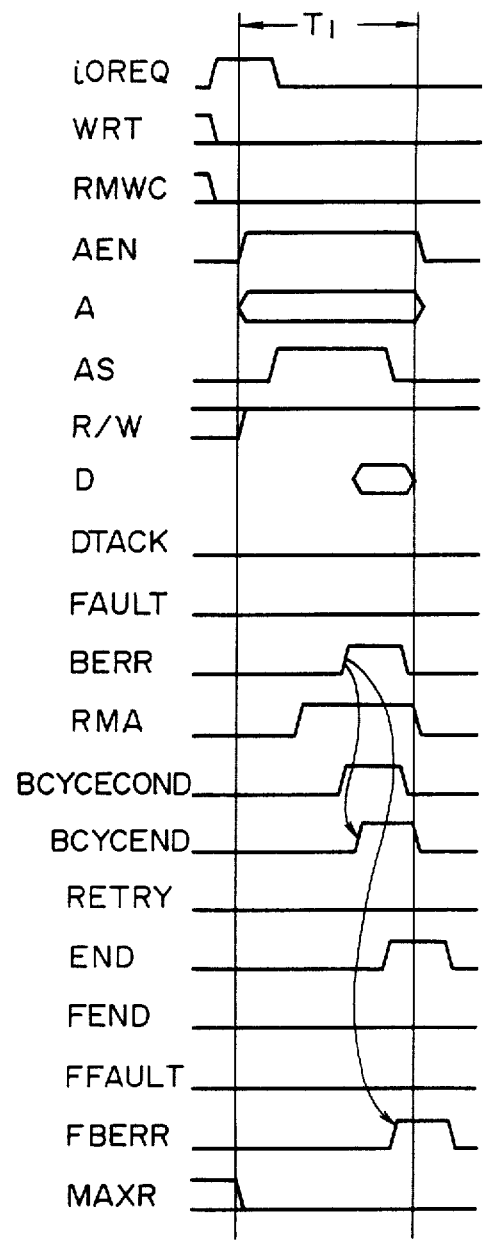
Figure 4D:
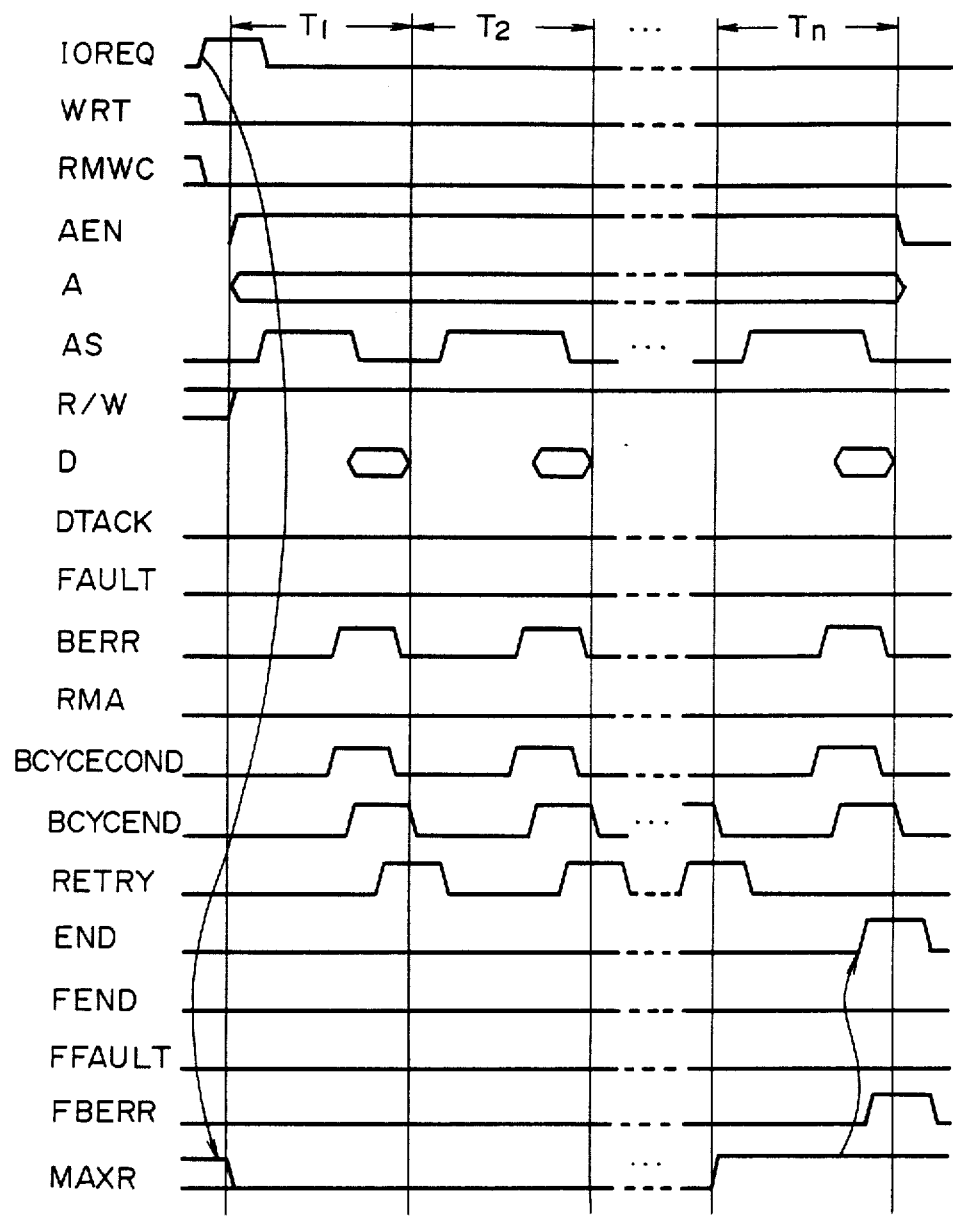

On the other hand, let us assume that the address signal A 141 accesses the I/0 area of the address space of FIG. 5. If the bus error signal BERR 147 is asserted when the address signal A 141 accesses the input means of the I/0 equipments, it means that there is a data error such as a parity error in the data signal D 144 transferred from the input means of the I/0 equipments to the microprocessor 100 through the asynchronous transfer bus. The same data as that transferred from the input means of the I/0 equipments to the microprocessor 100 by the command from the microprocessor 100 no longer exists in the input means after the transfer. In this case, the bus error signal BERR 147 is asserted and the retry of data transfer from the input means to the microprocessor 100 is insignificant. FIG. 4c shows that retry of data transfer is not performed in such case.

When the address signal A 141 accesses the I/0 area of the address space of FIG. 5, the register access circuit 421 of the control register device 420 asserts the special access response signal RMA 148. On the other hand, the bus error signal BERR 147 is asserted by the data error in the data signal D 144, as described above. The asserted signal RMA 148 is supplied to the bus cycle control circuit 130 of the microprocessor 100 through the asynchronous transfer bus 140. In this case, since the retry signal RETRY 136 is not asserted by the memory control circuit 130 in the bus cycle $T_1$, the bus control unit 120 does not retry the data transfer. On the other hand, the bus cycle control circuit 130 asserts the end of bus cycle signal BCYCEND 135, end signal END 137 and fetch bus error signal FBERR 116. In response to the fetch bus error signal FBERR 116, the control unit 110 of the microprocessor 100 commands the bus error exceptional processing routine, which checks status of the input means of the I/0 devices and informs to a user through the output means of the I/0 equipments that the input job by the input means should be retried.

On the other hand, a serious parity error or soft error may take place for a long period of time in the data signal D 144 by the soft error of the memory circuit of the memory device 410 due to electromagnetic interference around the microprocessor or abnormal increase of irradiated o particles. In such a case, the data transfer is not successful even if the retry shown in FIG. 4a is repeated. If the retry of data transfer is endlessly repeated, the microprocessor 100 endlessly repeats useless routine and a significant time is required for the user to recognize such abnormal state. Accordingly, a limit is set to the number of times of repetition of retry, and if the retry does not success before the limit is reached, the bus error exceptional processing routine is executed to inform the abnormal state to the user and further retry is inhibited. FIG. 4c illustrates this operation.

If the (n−1)th data transfer does not success, n-th and subsequent retries are inhibited. The bus error signal BERR 147 is asserted in the (n-1)th bus cycle $T_{n-1}$ but the transfer acknowledge signal DTACK 145 is not asserted. When the (n-2)th retry signal RETRY 136 is applied to the retry counter 134 of the bus cycle control circuit 130 of FIG. 3, the signal MAXR 138 is asserted by the circuit 130. In the n-th bus cycle $T_n$, the retry signal RETRY 136 is no longer asserted while the end of bus cycle signal BCYCEND 135, end signal END 137 and fetch bus error signal FBERR 116 are asserted. In response to the fetch bus error signal FBERR 116, the control unit 110 of the microprocessor 100 executes the bus error exceptional processing routine to inform the abnormal state.

Figure 6:
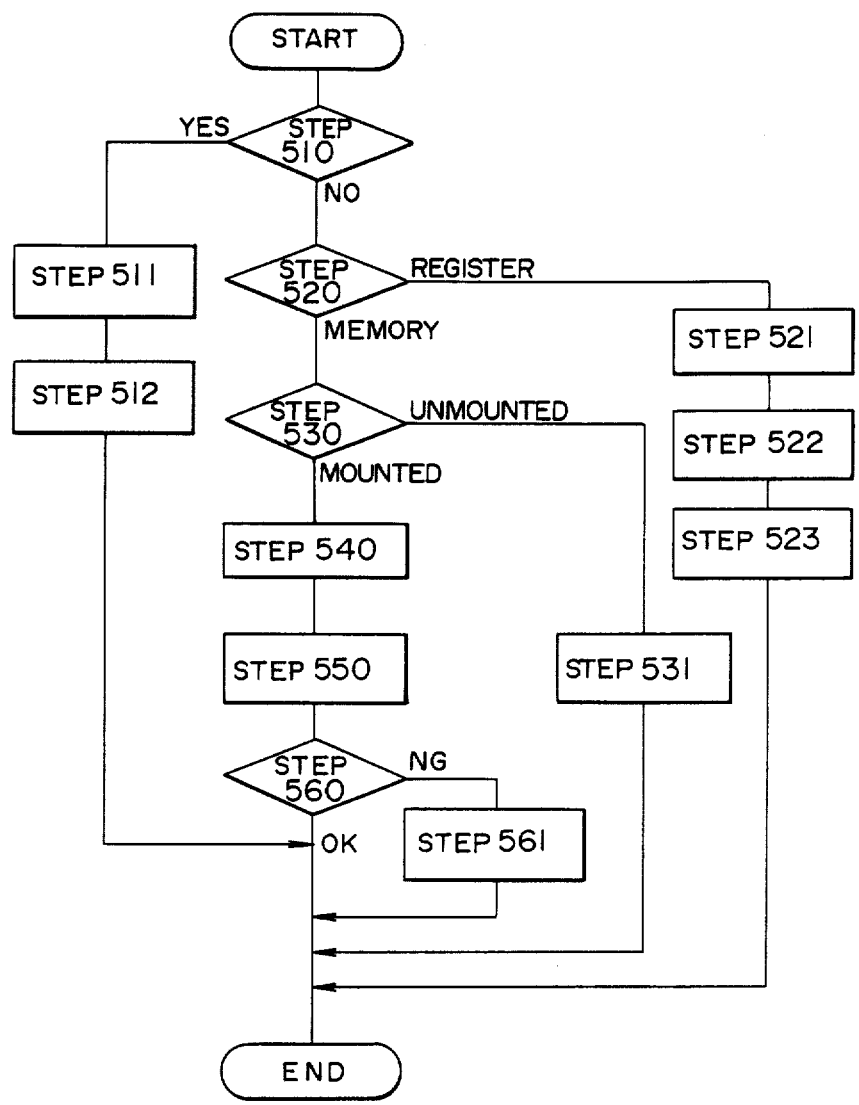
FIG. 6 shows a flow chart of a data transfer operation of the data processing system.
Figure 7:
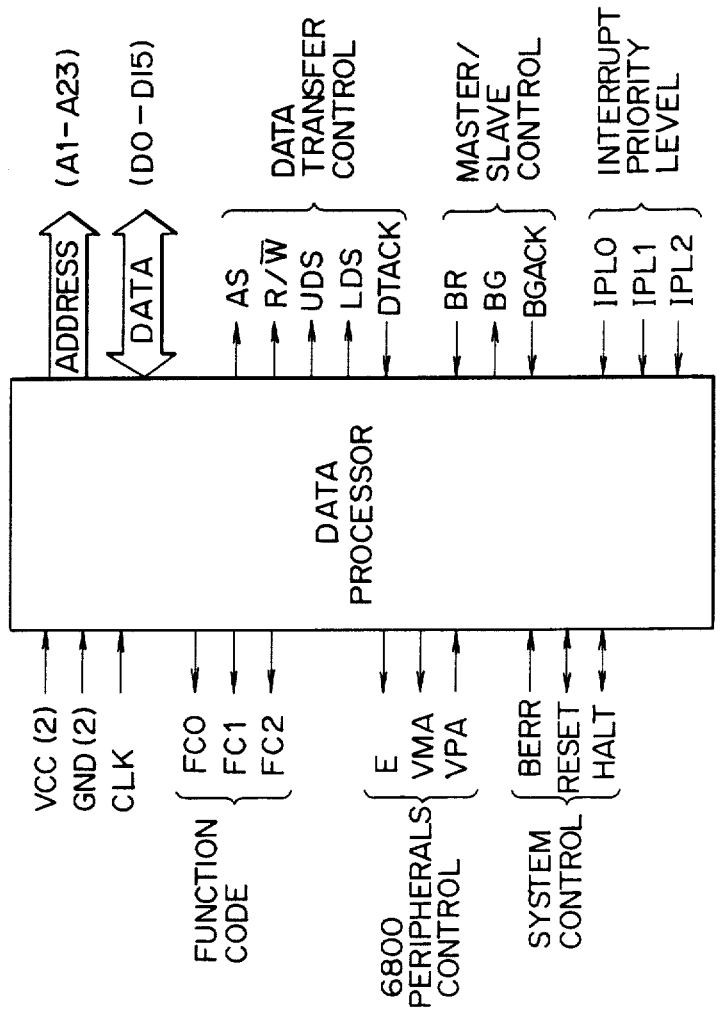
FIG. 7 shows a known microprocessor.
Figure 8:
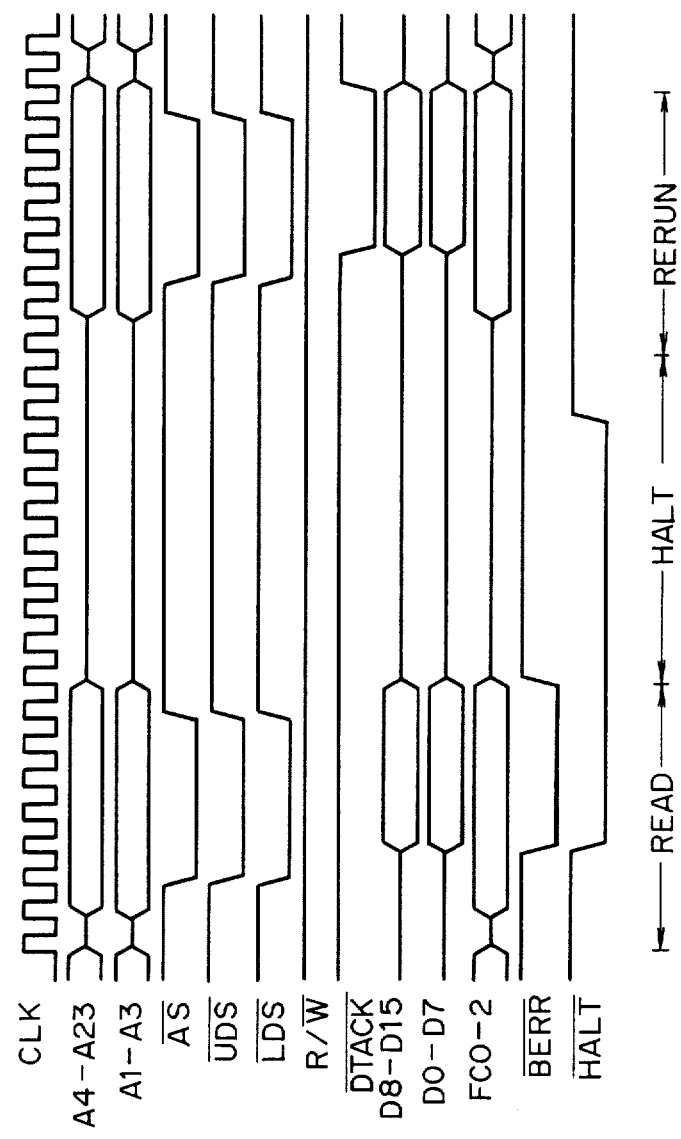
FIG. 8 shows a time chart of signal waveforms for explaining the operation of the microprocessor of FIG. 7.

FIG. 6 shows a flow chart of the operation of the data processing system shown in FIG. 1.

When the data transfer is started, the address is first checked, and if it is a retry cycle by an ECC error (step 510), a corrected data is sent (step 511) and the DTACK 145 is asserted (step 512). The flow of the steps 510–512 corresponds to the retry of FIG. 4a.

If it is not the retry cycle by the ECC error, whether the access space is a memory area or a register area is checked (step 520), and if it is the register area, the RMA 148 is asserted (step 521), the register is accessed (step 522) and the DTACK 145 is asserted (step 523). The flow of the steps 520–523 corresponds to the non-retry operation of FIG. 4c.

On the other hand, if the access space is the memory area, whether it is a mounted area or not is checked (step 530), and if it is unmounted, the FAULT 146 is asserted (step 531). If it is mounted, the memory is accessed (step 540), the DTACK 145 is asserted (step 550) and the ECC check is performed (step 560). If an ECC error is detected, the BERR 147 is asserted (step 561). On the other hand, the flow of the steps 530–531 corresponds to the non-retry operation of FIG. 4b.

In the present embodiment, the ECC check of the memory device and the correction are divided into two bus cycles. In the first cycle, the memory readout and the ECC check are performed, and in the second bus cycle, the correction and the data transfer are performed. Accordingly, high speed memory access is attained when ECC error is not included.

In the present embodiment, the retry of the bus cycle is started by one external input signal. Accordingly, a timing margin of the retry start circuit is large and high speed data transfer is attained. Further, it is possible to have an external input signal for inhibiting retry. In this case, a malfunction due to the retry access to the control register can be prevented.

In the present embodiment, the retry may be inhibited by the command of the control unit in the processor. Accordingly, the retry may be inhibited in the read-modify-write cycle to prevent malfunction. The number of times of retry is counted and if a bus error is still detected when the number of times reaches the limit, the retry is inhibited. Accordingly, an endless loop of retry is prevented and a reliability of the system is improved.

In accordance with the present invention, in the data processing system which transfers data to and from the external equipments, if the data transfer ends abnormally, the retry of the data transfer is requested by the signal from the input means. Accordingly, the design of the external circuit is facilitated and the data processing system which performs the retry of the data transfer cycle in a manner suitable to the microprocessor is provided.

We claim:

1. A microprocessor for communicating with a peripheral equipment through a bus, comprising:
   (a) a bus control unit for supplying at least an address signal and a data signal to said bus; and (b) control means coupled to said bus and said bus control unit, said control means including (b1) first means, responsive to a first signal generated by said peripheral equipment indicating that an error has occurred during communication through said bus, for producing a second signal commending a retry of the communication to said bus control unit, and (b2) second means, responsive to a third signal generated by said peripheral equipment indicating that said address signal corresponds to an unmounted area in an address space of said microprocessor for inhibiting the retry of the communication to said bus control unit, said unmounted area being an area of said address space not in use by said peripheral equipment.

2. A microprocessor according to claim 1 further comprising:

(c) means, responsive to an output signal supplied by an output means of I/O device of said peripheral equipment to inhibit a retry supplied by said second means of said control means, for informing a user that said address signal corresponds to the unmounted area.

3. A microprocessor for communicating with a peripheral equipment through a bus, comprising:

(a) a bus control unit for supplying at least an address signal and a data signal to said bus; and (b) control means coupled to said bus and said bus control unit, said control means including (b1) first means, responsive to a first signal generated by said peripheral equipment indicating that an error has occured during communication through said bus, for producing a second signal to command a retry of the communication to said bus control unit, and (b2) second means, responsive to a third signal generated by said peripheral equipment indicating that said address signal corresponds to an area of an address space which corresponds to an I? 0 device of said peripheral equipment, for inhibiting the retry of the communication to said bus control unit.

4. A microprocessor according to claim 3 further comprising:

(c) means, responsive to an output signal supplied by an output means of said I/O control means of said peripheral equipment to inhibit the retry supplied from said second means of said control means, for informing a user that said address signal corresponds to the area of said device which corresponds to said I/O device.

5. A microprocessor according to claim 1, wherein said first signal generated by said peripheral equipment indicates that said error has occured during communication with a mounted area in said address space of said microprocessor, said mounted area being an area of said address space occupied by said peripheral equipment.

6. A microprocessor according to claim 5, wherein said control means further includes:

(b3) third means for counting a number of times of retry commanded by said first means and inhibiting further retry when said number of times reaches a predetermined number.

7. A microprocessor according to claim 3, wherein said first signal generated by said peripheral equipment indicates that said error has occured during said communication with a mounted memory area in said address space of said microprocessor, said mounted area being an area of said address space occupied by peripheral equipment.

8. A microprocessor according to claim 7, wherein said control means further includes:

(b3) third means for counting a number of times of retry commanded by said first means and inhibiting further retry when said number of times reaches a predetermined number.

* * * * *